(12) United States Patent
Michishita

(10) Patent No.: US 12,041,211 B2
(45) Date of Patent: Jul. 16, 2024

(54) IMAGE FORMING APPARATUS, CONTROL METHOD FOR IMAGE FORMING APPARATUS, AND STORAGE MEDIUM FOR USING JOB LOGS

(71) Applicant: CANON KABUSHIKI KAISHA, Tokyo (JP)

(72) Inventor: Takumi Michishita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/868,549

(22) Filed: Jul. 19, 2022

(65) Prior Publication Data

US 2023/0021784 A1    Jan. 26, 2023

(30) Foreign Application Priority Data

Jul. 21, 2021    (JP) .................................. 2021-120248

(51) Int. Cl.
*H04N 1/32* (2006.01)
*H04N 1/00* (2006.01)

(52) U.S. Cl.
CPC ..... *H04N 1/32106* (2013.01); *H04N 1/00344* (2013.01); *H04N 2201/3202* (2013.01)

(58) Field of Classification Search
CPC ........... H04N 1/32106; H04N 1/00344; H04N 2201/3202
See application file for complete search history.

(56) References Cited

U.S. PATENT DOCUMENTS

| | | | | |
|---|---|---|---|---|
| 2006/0061820 A1* | 3/2006 | Okamoto | ........... | H04N 1/32122 358/1.15 |
| 2007/0135930 A1* | 6/2007 | Kirihara | ............. | H04N 1/32101 700/1 |
| 2007/0273921 A1* | 11/2007 | Yamakawa | ........ | G06K 15/1818 358/1.15 |
| 2008/0130884 A1* | 6/2008 | Matsumoto | ........ | H04N 1/00244 380/200 |
| 2009/0240740 A1* | 9/2009 | Ohsawa | ............. | H04N 1/32101 |
| 2010/0225978 A1* | 9/2010 | Yamaguchi | ........ | H04N 1/00244 358/474 |
| 2011/0090533 A1* | 4/2011 | Shimizu | ................. | G06K 15/18 358/1.15 |
| 2021/0014381 A1* | 1/2021 | Achiwa | ............. | H04N 1/00114 |

FOREIGN PATENT DOCUMENTS

JP    2020072342 A    5/2020

* cited by examiner

*Primary Examiner* — Nicholas Pachol
(74) *Attorney, Agent, or Firm* — Canon U.S.A., Inc. I.P. Division

(57) ABSTRACT

An image forming apparatus capable of communicating with one or more information processing apparatuses via a network, includes one or more controllers having one or more processors and one or more memories, the one or more controllers being configured to perform log generation of generating a plurality of types of logs including a log related to a job, and to perform log storage of storing the plurality of types of logs, wherein the log storage stores a first type log and a second type log larger than the first type log in volume when the job is a job related to a first condition of using an external network, and stores the first type log and does not store the second type log when the job is a job related to a condition different from the first condition.

21 Claims, 6 Drawing Sheets

| | TRANSMISSION/ RECEPTION DESTINATION | JOB TYPE | OPERATION LOG AUTHENTICATION LOG | JOB LOG | IMAGE LOG | ENGINE LOG |
|---|---|---|---|---|---|---|
| 1 | IMAGE TRANSFER FROM OUTSIDE | EXTERNAL NETWORK | INPUT | STORED | STORED | STORED | NOT STORED |
| 2 | PRINT OF IMAGE TRANSFERRED FROM OUTSIDE | EXTERNAL NETWORK | PRINT | STORED | STORED | STORED | STORED |
| 3 | IMAGE DATA TRANSFER TO OUTSIDE | EXTERNAL NETWORK | OUTPUT | STORED | STORED | STORED | NOT STORED |
| 4 | IMAGE TRANSFER FROM SPECIFIC TRANSMISSION SOURCE | INTERNAL NETWORK | INPUT | STORED | STORED | NOT STORED | NOT STORED |
| 5 | PRINT OF IMAGE TRANSFERRED FROM SPECIFIC TRANSMISSION SOURCE | INTERNAL NETWORK | PRINT | STORED | STORED | NOT STORED | STORED |
| 6 | IMAGE DATA TRANSFER TO SPECIFIC DESTINATION | INTERNAL NETWORK | OUTPUT | STORED | STORED | NOT STORED | NOT STORED |
| 7 | PRINT OF IMAGE STORED IN IMAGE FORMING APPARATUS | — | PRINT | STORED | STORED | NOT STORED | STORED |
| 8 | SCAN AND STORE | — | INPUT | STORED | STORED | NOT STORED | NOT STORED |
| 9 | LOCAL COPY | — | PRINT | STORED | STORED | NOT STORED | STORED |

| | TRANSMISSION/ RECEPTION DESTINATION | JOB TYPE | OPERATION LOG AUTHENTICATION LOG | JOB LOG | IMAGE LOG | ENGINE LOG |
|---|---|---|---|---|---|---|
| 1 IMAGE TRANSFER FROM OUTSIDE | EXTERNAL NETWORK | INPUT | STORED | STORED | STORED | NOT STORED |
| 2 PRINT OF IMAGE TRANSFERRED FROM OUTSIDE | EXTERNAL NETWORK | PRINT | STORED | STORED | STORED | STORED |
| 3 IMAGE DATA TRANSFER TO OUTSIDE | EXTERNAL NETWORK | OUTPUT | STORED | STORED | STORED | NOT STORED |
| 4 IMAGE TRANSFER FROM SPECIFIC TRANSMISSION SOURCE | INTERNAL NETWORK | INPUT | STORED | STORED | NOT STORED | NOT STORED |
| 5 PRINT OF IMAGE TRANSFERRED FROM SPECIFIC TRANSMISSION SOURCE | INTERNAL NETWORK | PRINT | STORED | STORED | NOT STORED | STORED |
| 6 IMAGE DATA TRANSFER TO SPECIFIC DESTINATION | INTERNAL NETWORK | OUTPUT | STORED | STORED | NOT STORED | NOT STORED |
| 7 PRINT OF IMAGE STORED IN IMAGE FORMING APPARATUS | — | PRINT | STORED | STORED | NOT STORED | STORED |
| 8 SCAN AND STORE | — | INPUT | STORED | STORED | NOT STORED | NOT STORED |
| 9 LOCAL COPY | — | PRINT | STORED | STORED | NOT STORED | STORED |

401   402   403   404

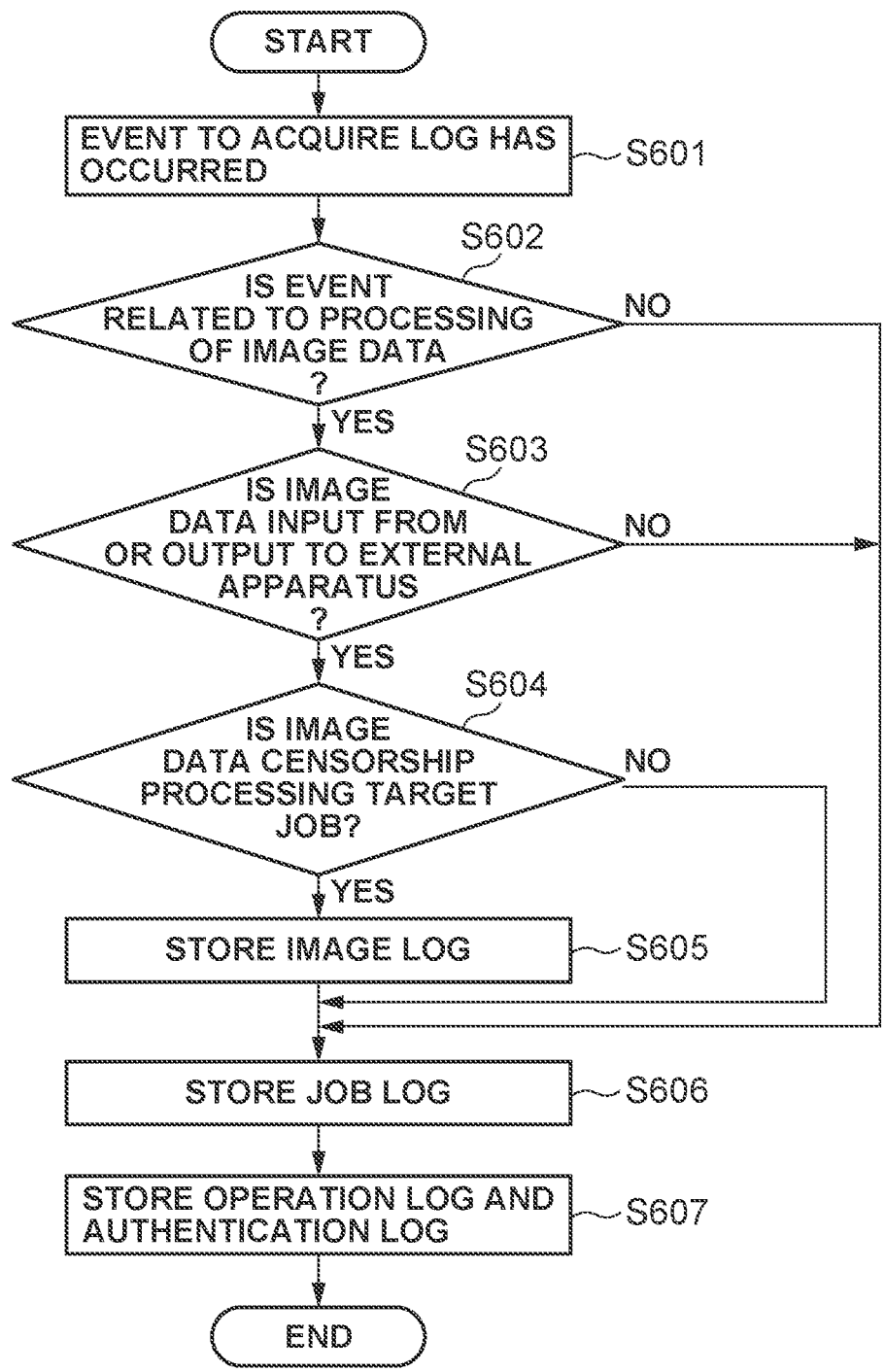

IMAGE FORMING APPARATUS, CONTROL METHOD FOR IMAGE FORMING APPARATUS, AND STORAGE MEDIUM FOR USING JOB LOGS

BACKGROUND

Field

The present disclosure relates to an image forming apparatus, a control method for the image forming apparatus, and a storage medium.

Description of the Related Art

Places where information processing apparatuses and image forming apparatuses are installed and user's environments have been diversified, and in terms of usage, the apparatuses are accessed not only from within a firewall, for example, within a company, but are also accessed more and more directly from an external network such as the Internet.

In such a situation, an appropriate application of security suitable for a usage environment has become required.

As a security management strategy, there is a method of collecting trails of operations of an image forming apparatus as much as possible. The collected trails are used, when a problem related to the security has occurred in the image forming apparatus, to analyze the cause and determine the damage situation. Japanese Patent Application Laid-open No. 2020-72342 discusses a technique of storing audit logs in a storage area.

By storing the audit logs in the storage area, when a problem related to the security occurs, it is possible to promptly provide the audit logs to a management server that analyzes the cause and determines the accurate damage situation.

SUMMARY

According to various embodiments of the present disclosure, an image forming apparatus capable of communicating with one or more information processing apparatuses via a network, includes one or more controllers having one or more processors and one or more memories, the one or more controllers being configured to perform log generation of generating a plurality of types of logs including a log related to a job, and to perform log storage of storing the plurality of types of logs, wherein the log storage stores a first type log and a second type log larger than the first type log in volume when the job is a job related to a first condition of using an external network, and stores the first type log and does not store the second type log when the job is a job related to a condition different from the first condition.

Further features of the present disclosure will become apparent from the following description of example embodiments with reference to the attached drawings.

BRIEF DESCRIPTION OF THE DRAWINGS

FIG. 4 is an example of a correspondence table between job types and audit logs to be stored according to a first example embodiment of the present disclosure.

FIG. 6 is an example of a flowchart illustrating storage processing of audit logs according to a second example embodiment of the present disclosure.

DESCRIPTION OF THE EMBODIMENTS

Example embodiments of the present disclosure will be described in detail with reference to the attached drawings. Note that the following example embodiments are not intended to limit the invention related to the claims, and all the combinations of the features described in the following example embodiments are not necessarily essential. In an example embodiment, a description will be given of an image forming apparatus as an example of an information processing apparatus. However, it is not limited thereto.

Examples of an audit log include an operation log, an authentication log, a job log, and an image log. The operation log indicates a content of a user operation on an operation unit of an image forming apparatus. The authentication log indicates authentication information used at a time of user authentication. The job log indicates a history of a job executed by an image forming apparatus. The image log is a relatively large volume log including image data processed in a print job or a scan job. By storing these audit logs in a storage area, when a trouble related to a security occurs, the audit logs can be promptly provided to a management server that analyzes the cause of the trouble, and the damage can be accurately grasped.

There are jobs generated via an external network, jobs generated via an internal network, and local jobs generated not via a network, among jobs generated in the image forming apparatus.

If the audit logs are uniformly acquired even though audit logs to be held for guaranteeing the security are different depending on generation conditions of the jobs, there is an issue that a heavy load is applied to a storage area on the image forming apparatus side. For this reason, various embodiments of the present disclosure are directed to a technique for reducing the load applied to the storage area while holding the audit logs that are useful when an issue related to the security occurs in consideration of the generation conditions of the jobs.

Figure 1:
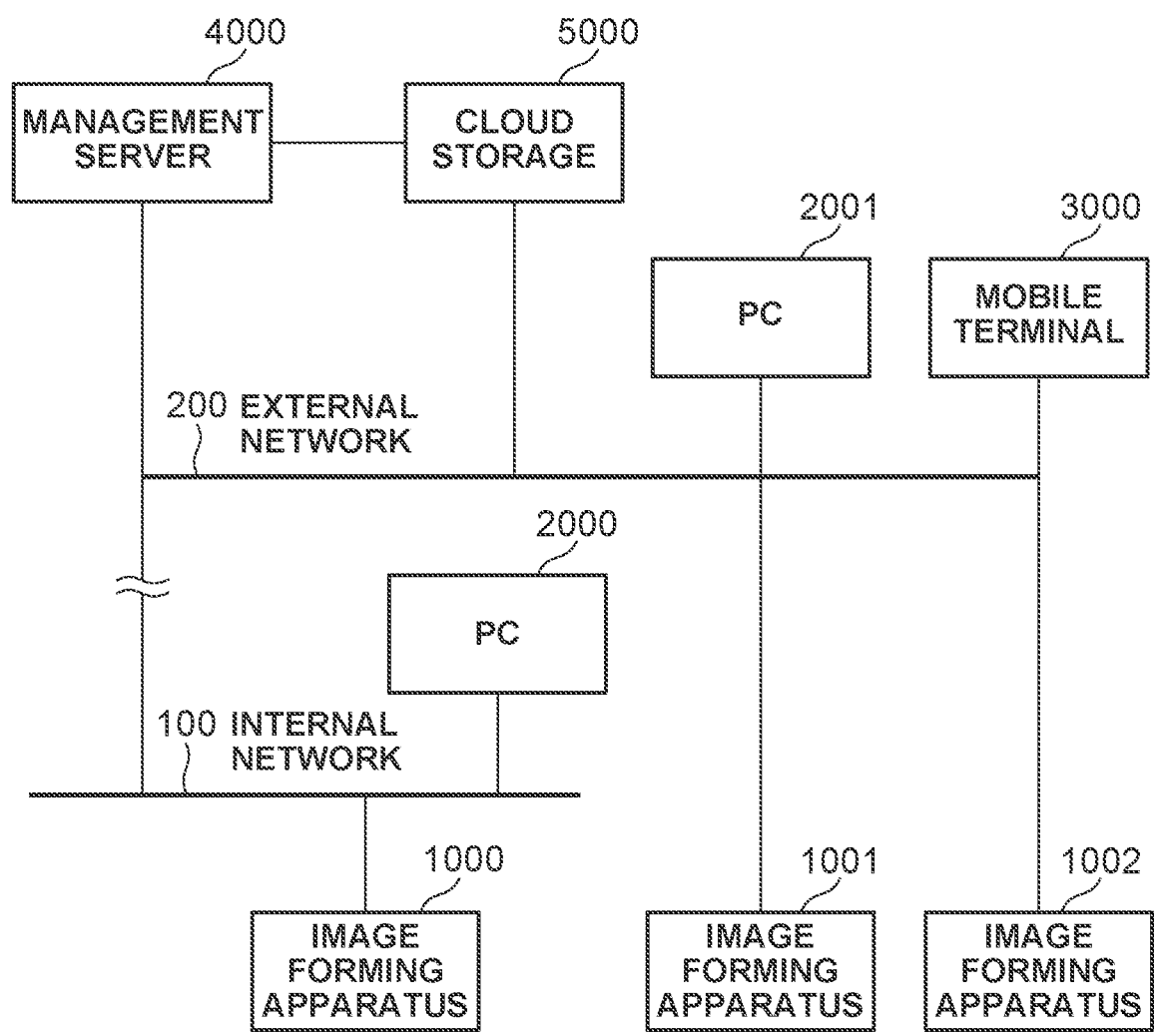
FIG. 1 is a block diagram illustrating an example of a system configuration according to example embodiments of the present disclosure.

FIG. 1 is a block diagram illustrating a network configuration of the image forming apparatus according to an example embodiment of the present disclosure. In the present example embodiment, a description will be given of a system including, for example, a plurality of image forming apparatuses 1000, 1001, and 1002 different in installation environment. In FIG. 1, the image forming apparatus 1000 is assumed to be installed in an office. Further, the image forming apparatus 1002 is assumed to be installed in a shared space such as a co-working space, and the image forming apparatus 1003 is assumed to be installed at a residence for a remote working use. The installation environments of the image forming apparatuses are not limited thereto.

The image forming apparatus 1000 having a print function can transmit and receive print data, image data obtained by scanning, management information of the image forming apparatus 1000 (device), and the like to and from another information processing apparatus via an internal network (i.e., local area network (LAN)) 100. The internal network 100 is, for example, a corporate network in an office protected by a firewall or a gateway. On the other hand, an external network 200 is assumed to be a network directly accessible through the Internet, but it is not specifically limited thereto. The image forming apparatus 1000 can communicate with a management server 4000 via the internal network 100 and the external network 200.

A personal computer (PC) 2000 can perform user authentication, reference, and operation to the image forming apparatus 1000 via the internal network 100. A PC 2001 can perform user authentication, reference, and operation to the image forming apparatuses 1000 to 1002 via the external network 200.

A mobile terminal 3000 can perform user authentication, reference, and operation to the image forming apparatuses 1000 to 1002 via the external network 200.

The management server 4000 can communicate with a cloud storage 5000 via the external network 200.

The cloud storage 5000 can directly communicate with the PC 2000, PC 2001, and the mobile terminal 3000 via the external network 200.

The image forming apparatuses 1000 to 1002 according to the present example embodiment refer to and operate the print data stored in the cloud storage 5000 via the management server 4000.

FIG. 1 illustrates an example in which only a single device is provided for each of the image forming apparatuses 1000 to 1002, the management server 4000, the cloud storage 5000, the PCs 2000 and 2001, and the mobile terminal 3000, but the system may include a plurality of devices for each of the apparatuses. The type and the number of the image processing apparatuses are not limited to the example.

Figure 2:
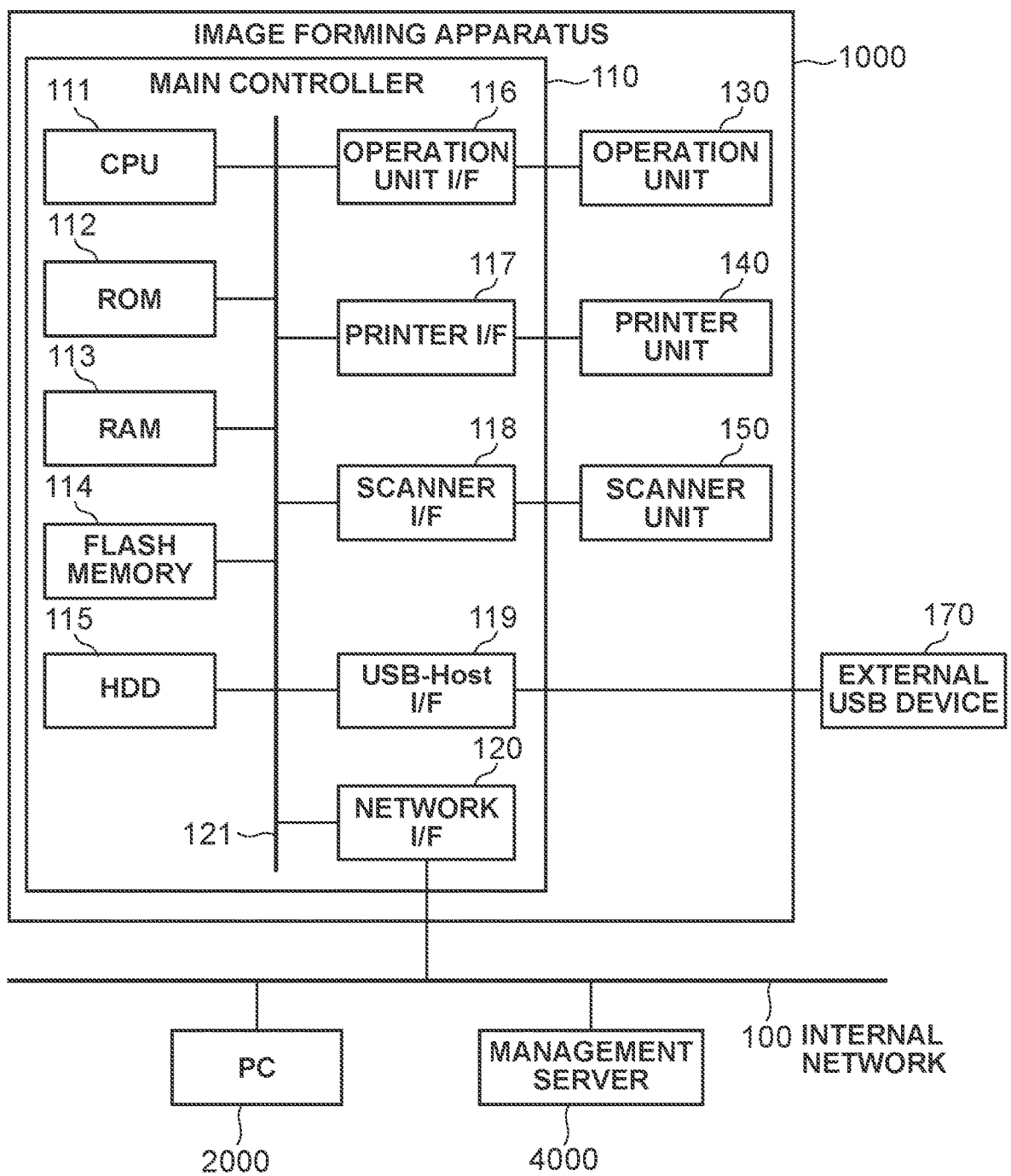
FIG. 2 is a block diagram illustrating a hardware configuration of an image forming apparatus according to the example embodiments of the present disclosure.

FIG. 2 is a block diagram illustrating a hardware configuration of the image forming apparatus 1000.

In FIG. 2, the image forming apparatus 1000 includes a main controller 110, an operation unit 130, a printer unit 140, and a scanner unit 150. The main controller 110 is connected to the operation unit 130, the printer unit 140, and the scanner unit 150. Further, the main controller 110 includes a central processing unit (CPU) 111, a read-only memory (ROM) 112, a random-access memory (RAM) 113, a flash memory 114, and a hard disk drive (HDD) 115. Further, the main controller 110 includes an operation unit interface (I/F) 116, a printer I/F 117, a scanner I/F 118, a universal serial bus (USB)-Host I/F 119, and a network I/F 120. These components are connected with each other via a system bus 121.

The CPU 111 reads a program for the main controller 110 stored in the ROM 112 or the flash memory 114 into the RAM 113 and executes the program. Examples of the program for the main controller 110 include an application program for printing. When the CPU 111 executes the application program for printing, print data stored in the HDD 115 is converted into image data to be printed on a sheet by the printer unit 140.

The image data is stored in the HDD 115. Further, the examples of the program for the main controller 110 include an application program for scanning. When the CPU 111 executes the application program for scanning, the scanner unit 150 reads a set document to generate image data of the document. The image data is also stored in the HDD 115.

The ROM 112 is a read-only memory that stores a boot program for the main controller 110, a Basic Input/Output System (BIOS), and fixed parameters.

The RAM 113 is a random-access memory for storing a program and temporary data to be used when the CPU 111 controls the main controller 110.

The flash memory 114 stores an operating system and various programs. The flash memory 114 stores, in addition to execution programs related to scan operation and print operation, for example, license information for enabling the function of the image forming apparatus 1000 and a control program related to the security.

The HDD 115 is a nonvolatile magnetic-storage device for storing some applications, various data, and print data received from the PC 2000 via the network I/F 120. The HDD 115 stores log data that records operations of the image forming apparatus 1000, a job log of the image forming apparatus 1000, and a log of input and output image data. In addition, while the HDD 115 is used in the present example embodiment, a nonvolatile semiconductor memory device such as a solid state drive (SSD) or an embedded MultiMedia Card (eMMC) may be used.

The HDD 115 may be logically divided into a temporary area and a box area.

The temporary area is an area for temporarily storing rasterized data of a page description language or image data received from the scanner unit 150 in order to change an output order of pieces of image data or to enable outputting a plurality of copies by one scan. The box area is an area used for a box function and is divided into a predetermined number of areas. Each area is assigned to a user or the like, and each area is assigned a corresponding box number, a box name, and a password. A user can access, by designating the box number, the area corresponding to the box number, read, by inputting the password, image data in the corresponding area, and print out or transmit the image data.

The operation unit I/F 116 is an interface for transmitting an instruction input by the user of the image forming apparatus 1000 via the operation unit 130 to the CPU 111. Further, the operation unit I/F 116 receives, from the CPU 111, processing contents used to switch the contents to be displayed on the operation unit 130, and transmits the received processing contents to the operation unit 130. In addition, the operation unit 130 includes a keyboard and a liquid crystal display unit having a touch panel function, displays a state of the image forming apparatus 1000 and an operation menu, and receives an instruction from the user.

The printer I/F 117 is an interface for connecting the main controller 110 and the printer unit 140. The printer unit 140 performs printing on a recording medium based on image data transferred from the HDD 115 via the printer I/F 117.

The scanner I/F 118 is an interface for connecting the main controller 110 and the scanner unit 150. The scanner unit 150 (i.e., input unit for inputting image data) reads an image on a document as image data using a line sensor including, for example, a Charge Coupled Device (CCD) sensor. Then, the scanner unit 150 transfers the read image data to the HDD 115 via the scanner I/F 118. The image data transferred to and stored in the HDD 115 can be printed by the above-described printer unit 140. The duplicate (copy) processing can be performed by the printer unit 140 printing the image data read by the scanner unit 150.

The USB-Host I/F 119 is an interface for connecting the main controller 110 and an external USB device 170. An example of the external USB device 170 is a facsimile (FAX) unit. In the example of the FAX unit, a FAX transmission is performed based on image data to be transferred from the HDD 115 via the USB-Host I/F 119.

Further, the FAX unit generates image data based on the received data and transfers the generated image data to the HDD 115 via the USB-Host I/F 119. The image data stored in the HDD 115 is printed on the storage medium by the printer unit 140, as described above. Examples of the external USB device 170 include a USB memory and a USB keyboard. From the USB memory, an update file required for a firmware update can be transferred.

The network I/F 120 connects the main controller 110 to the internal network 100 to communicate with the PC 2000 located on the internal network 100. Whether the connection is performed via the external network 200 is determined as described below. For example, a port number of a router that relays access from the external network 200 or an Internet Protocol (IP) address are registered to the HDD 115 in the image forming apparatus 1000 in advance. Then, it is determined by comparing the registered port number or the IP address with that used to connect to the transmission/reception destination. More specifically, if the port number or the IP address used to connect to the transmission/reception destination is registered to the HDD 115, it is determined that the connection is performed via the external network 200. On the other hand, if the port number or the IP address used to connect to the transmission/reception destination is not registered to the HDD 115, it is determined that the connection is performed via the internal network 100.

Alternatively, a device or an external apparatus that is connected to the internal network 100 may be registered in advance, and the determination may be performed based on whether the port number or the IP address of the transmission/reception destination is registered. However, the registered transmission/reception destination and the method of the determination are not limited thereto. The PC 2000 is connected to the image forming apparatus 1000 via the external network 200, and can transmit and receive print data to and from the image forming apparatus 1000, operate the image forming apparatus 1000 via a web browser, and transmit a firmware file to the image forming apparatus 1000.

Further, the image forming apparatus 1001 is connected to the management server 4000 via the external network 200. The print data stored in the cloud storage 5000 illustrated in FIG. 1 is referred to and operated via the management server 4000. Depending on the installation environment of the image forming apparatus 1001, the image forming apparatus 1001 may not be connected to the management server 4000.

Figure 3:
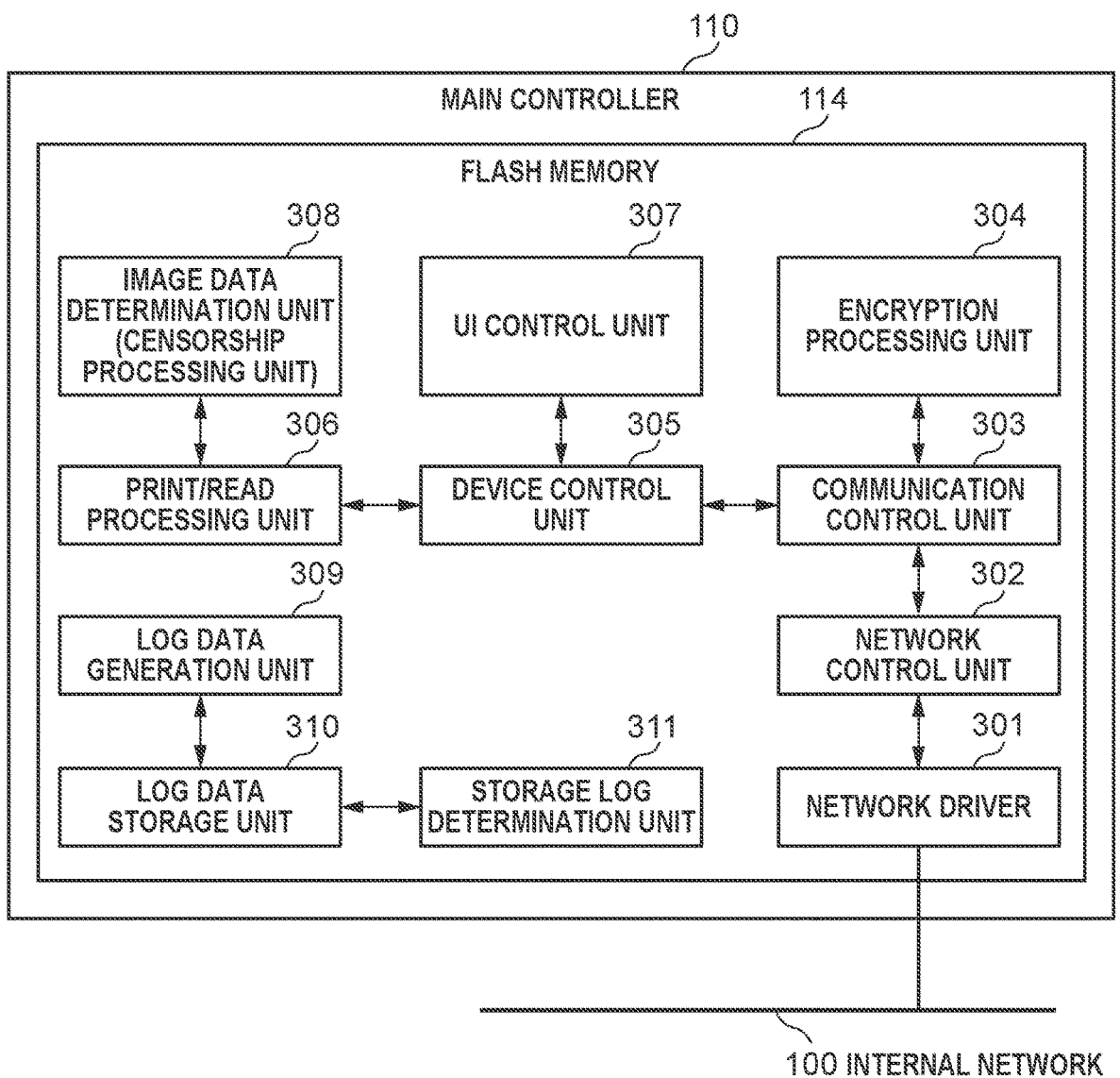
FIG. 3 is a block diagram illustrating an example of a software configuration in a main controller of the image forming apparatus according to the example embodiments of the present disclosure.

FIG. 3 is a block diagram illustrating software modules included in the image forming apparatus 1000 according to the present example embodiment. The software modules illustrated in FIG. 3 are implemented by the CPU 111 executing programs stored in the flash memory 114.

A network driver 301 controls the network I/F 120 connected to the internal network 100 to transmit and receive data to and from the outside via the internal network 100.

A network control unit 302 controls communications in layers of a transport layer and lower layers in a network communication protocol such as Transmission Control Protocol/Internet Protocol (TCP/IP), to transmit and receive data. The network control unit 302 also determines an input/output destination of data including image data controlled by the image forming apparatus 1000.

A communication control unit 303 is a module for controlling a plurality of communication protocols supported by the image forming apparatus 1000. The encrypted communication supported by the image forming apparatus 1000, such as Transport Layer Security (TLS), is executed by the communication control unit 303.

An encryption processing unit 304 is a module for performing various encryption processing such as encryption/decryption processing of data, generation/verification of an electronic signature, and generation of a hash value. The encryption processing unit 304 also performs encryption processing in encrypted communication processing such as TLS that is executed by the communication control unit 303.

A device control unit 305 is a module for generating a control command and control data for the image forming apparatus 1000 to perform overall control of the image forming apparatus 1000. The device control unit 305 performs user authentication instructed via the operation unit 130 and the operation unit I/F 116, or the network I/F 120.

A print/read processing unit 306 is a module for performing functions such as printing by the printer unit 140 and reading a document by the scanner unit 150. In the present example embodiment, an instruction of the scanning or the printing to the image forming apparatus 1000 can also be performed by user's instruction via the operation unit 130. The controls of the operation unit 130 and the operation unit I/F 116 are performed by a user interface (UI) control unit 307.

An image data determination unit (also referred to as a censorship processing unit) 308 is a program for censoring the image data, controlled by the print/read processing unit 306. More specifically, the image data determination unit 308 determines whether an improper character string or image is included in the image data and limits the scan operation or the print operation. Alternatively, depending on a determination result of the image data, the image data determination unit 308 limits the input/output of the image data to the outside of the image forming apparatus 1000 via the internal network 100.

A log data generation unit 309 generates an audit log indicating a trail of operations of the image forming apparatus 1000. Specific examples of the audit log generated at this time include an operation log indicating a history of the user's instruction issued via the operation unit 130, and an authentication log indicating a history of the user authentication performed by using the input of identification (ID) and a password, or an integrated circuit (IC) card. Further, the specific examples of the audit log include a job log indicating a history of a job such as a scan job or a print job, and an image log storing image data processed along with the job by the image forming apparatus 1000 as a trail. Further, the specific examples of the audit log include an engine log that stores, as a history, detailed operation parameters such as states of the sensors of the printer unit 140 and the scanner unit 150 and operation environments of the image forming apparatus 1000. Each of the detailed operation parameters such as the states of sensors and the operation environments is referred to as a predetermined operation parameter. The operation log and the authentication log are logs each including data strings indicating operation user information and a clock time. On the other hand, the image log is an image including not only the data strings indicating the operation user information and the clock time, but also the image data. Accordingly, the image log is larger in volume than the operation log or the authentication log. In addition, since the engine log includes the detailed operation parameters, the engine log is larger in volume than the operation log or the authentication log.

A log data storage unit (also referred to as a log storage unit) 310 stores logs determined to be storage targets by a storage log determination unit 311 from among the log data generated by the log data generation unit 309, in a storage device such as the flash memory 114 or the HDD 115. In the present disclosure, the operation performed by the CPU 111 to store logs in a storage device is referred to as a storage.

Not all the log data generated by the log data generation unit 309 is stored in a storage device such as the HDD 115, and the storage log determination unit 311 determines whether to store the log data based on a job type and an input/output destination of the image data.

Next, with reference to FIG. 4, a description is given of a correspondence table used when the log data storage unit 310 specifies the log data to be stored in a storage device according to a first example embodiment.

Rows in a column 401 in FIG. 4 illustrate examples of operations executed by the image forming apparatus 1000. Rows in a column 402 illustrate input/output destinations respectively corresponding to the operations in the rows of the column 401. In the example illustrated in FIG. 4, the input/output destinations are assumed to be the internal network 100 and the external network 200. This is to distinguish between transmission and reception from a device connected to the internal network 100 such as a corporate network protected by a firewall or a gateway, and transmission and reception from a device connected to the external network 200 such as the Internet.

"Image transfer" written in each of the first and the fourth rows in the column 401 of FIG. 4 may be an operation of storing an image in the HDD 115 performed, for example, at a time of a reservation printing. The operation of "print of image stored in image forming apparatus" is written in the seventh row in the column 401 of FIG. 4. Further, "print of image" written in each of the second and the fifth rows in the column 401 is a print operation received from the PC 2001 and the PC 2000, respectively, using a printer driver. "Image data transfer" written in the third and the sixth rows in the column 401 assumes, for example, a function of transmitting a scanned image to the management server 4000 or the PC 2001, and the PC 2000, respectively.

Further, "scan and store" written in the eighth row in the column 401 assumes a case where image data generated by the scanner unit 150 of the image forming apparatus 1000 scanning a document is stored in the HDD 115. The "local copy" written in the ninth row assumes a case where image data generated by the scanner unit 150 of the image forming apparatus 1000 scanning a document is printed by the printer unit 140. The transmission/reception destinations in the seventh, eighth, and ninth rows in the column 402 are empty, and thus hyphens are written therein. As for the transmission/reception destinations of the image data indicated in the transmission/reception destination column 402, not only the classification such as the internal network 100 and the external network 200 but also the classification such as a specific transmission/reception destination set in advance, or a transmission/reception destination having no past record of transmission and reception, may be used. Alternatively, a method of determining security strengths of communication paths and classifying the input/output destinations depending on the determined security strengths may be employed. The method is not limited.

Each row in a column 403 indicates a job type of the corresponding operation. "Input" assumes processing of inputting image data to the image forming apparatus 1000. "Output" assumes processing of outputting image data to the transmission destination by the image forming apparatus 1000 via the external network 200 or the internal network 100, or processing of sending a FAX via the FAX unit connected to the external USB device 170. "Print" assumes processing of printing on a paper medium by the printer unit 140. In FIG. 4, the job types are indicated by the input/output processing of the data and the print processing, as an example. In addition, the job type may also be indicated by the image data censorship processing by the image data determination unit 308.

Each row in a column 404 indicates which log is stored for each operation as an audit log in the HDD 115. In FIG. 4, each log to be stored is indicated as "stored", and each log not to be stored is indicated as "not stored". For example, in the case of image transfer from the external network 200, a job log and an image log are stored as audit logs in addition to an operation log and an authentication log. In the case of the local copy where no data exchange is performed with the outside, only the operation log and the authentication log are stored as the audit logs. In this way, it is possible to switch target data to be stored as an audit log based on the data transmission/reception destination or the job type as a generation condition of a job. In addition, the target data to be stored as the audit log can be set by an administrator of the image forming apparatus 1000, and it is not limited to the examples illustrated in FIG. 4.

Next, with reference to FIG. 5, a flowchart illustrating storage processing of the audit log executed by the image forming apparatus 1000 will be described. A program for implementing operations of the flowchart is stored in the flash memory 114 and executed by the CPU 111.

In step S501, the CPU 111 detects that an event that can be a storage trigger of an audit log has occurred. Specific examples of the event include a user's operation of the operation unit 130, authentication processing, reception of a job via the network I/F 120, image control processing such as an image transfer and an image conversion, an execution of a scan job or a print job, and a state change such as a shift of power state.

Next, in step S502, the CPU 111 determines whether the event occurred in step S501 is an event related to processing of image data. If the event is not an event related to the processing of image data (NO in step S502), the processing proceeds to step S508. In step S508, the CPU 111 stores a job log, and in step S509, the CPU 111 stores an operation log and an authentication log. Then, the CPU 111 ends the processing. Examples of the event not related to the processing of image data include, for example, occurrence of power control event such as a sleep shift and a wake-up, a network packet transmission/reception, and some kind of error detection. In step S502, if the CPU 111 determines that the event is an event related to the processing of the image data (YES in step S502), the processing proceeds to step S503.

In step S503, the CPU 111 determines whether the input/output destination of the image data is an external information processing apparatus different from the image forming apparatus 1000. For example, if the job can be completed within the image forming apparatus 1000, such as a job that stores an image scanned by the scanner unit 150 in the HDD 115 and a normal copy job (NO in step S503), the processing proceeds to step S508. In step S508, the CPU 111 stores a job log. In step S509, the CPU 111 stores an operation log and an authentication log. Then, the CPU 111 ends the processing. While the job log is stored in step S508 in FIG. 5, the job log may not be stored. For example, the administrator of the image forming apparatus 1000 may be able to set whether to store each of the logs on a setting screen. Alternatively, the job log may not be stored in a case where the input/output destination of the image data is within the image forming apparatus 1000, depending on the storage capacity of the image forming apparatus 1000.

In step S503, if the CPU 111 determines that the input/output destination of the image data is an external information processing apparatus (YES in step S503), the processing proceeds to step S504.

In step S504, the CPU 111 determines whether the image data is input or output via the external network 200. If the input/output destination of the image data is an information processing apparatus connected to the external network 200 (YES in step S504), the processing proceeds to step S505. Otherwise (NO in step S504), the processing proceeds to step S506. In the present example embodiment, in the case where the input/output destination of the image data is an information processing apparatus connected to the internal network 100, it is regarded as a transmission to or a reception from a device connected to the corporate network protected by the firewall or the gateway in the office. Accordingly, the image log that has a large volume is not stored.

In step S505, the CPU 111 stores the image log in the HDD 115.

While, in step S504, the transmission/reception destination of the image data is determined based on the classification between the internal network 100 and the external network 200, the determination method is not limited thereto. For example, the determination may be performed based on a classification such as a specific transmission/reception destination set by the administrator of the image forming apparatus 1000 in advance, or a transmission/reception destination having no past record of transmission or reception. Alternatively, the transmission/reception destination may be classified and determined based on the security strength of a communication path.

In step S506, the CPU 111 determines whether the event related to the processing of the image data is a print job. If it is a print job (YES in step S506), the processing proceeds to step S507.

In step S507, the CPU 111 stores an engine log in the HDD 115. The engine log is, for example, a history of detailed operation parameters, such as the states of sensors in the printer unit 140 and the operation environments. In the present example embodiment, the engine log is acquired only for the print job because the volume becomes extremely large if the engine log is always acquired. More specifically, only the engine log when the print data is printed on a paper medium and output to the outside of the image forming apparatus 1000 is stored.

In steps S505 and S507, the cases where the image log and the engine log are acquired based on the determination results in steps S503 and S506, respectively, is described. However, the variation of the logs to be acquired can be changed depending on a difference of the storage area of the image forming apparatus 1000 or of the usage environment. Further, the administrator of the image forming apparatus 1000 may be allowed to set whether to store each log via a setting screen.

Subsequently, in step S508, the CPU 111 stores the job log in the HDD 115.

The job log is a history of the executed job, and the volume thereof is not as large as the volume of the image log or the engine log. In addition, in a case where the operation is performed locally, the CPU 111 may not store the job log.

Figure 5:
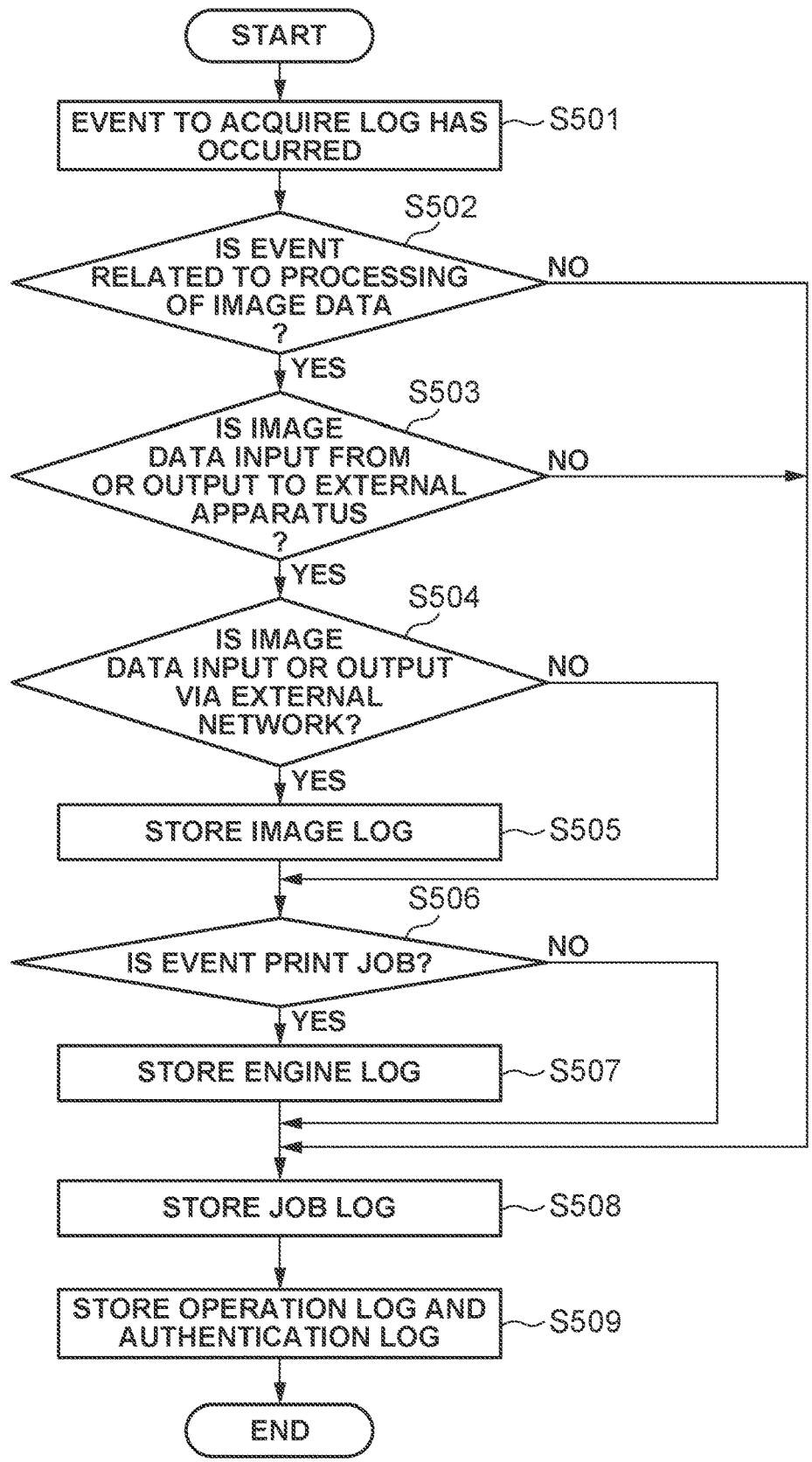
FIG. 5 is an example of a flowchart illustrating storage processing of the audit logs according to the first example embodiment of the present disclosure.

In step S509, the CPU 111 stores the operation log and authentication log that are targets for all the events, and ends the processing of the flowchart in FIG. 5. The volumes of the operation log and the authentication log are smaller than the volumes of the image log and the engine log.

In the present example embodiment, the HDD 115 is set as a default storage location of the image data. However, it is possible to store the image data in a storage location different from the HDD 115. For example, as a storage location of the image data, the image data may be stored in a storage device different from the HDD 115, such as the flash memory 114, included in the image forming apparatus 1000, or a storage device in an apparatus different from the image forming apparatus 1000. In the first example embodiment, the CPU 111 switches the types of the audit log to be stored in the HDD 115 of the image forming apparatus 1000 depending on the input/output destination of the job or the job type. In this way, it is possible to make the types of audit log to be stored fewer to acquire logs with relatively smaller volumes if the job does not pass through the external network 200, and to store a plurality of types of audit log if the job passes through the external network 200. Thus, it is possible to acquire audit logs necessary when a trouble occurs without posing a threat to the capacity of the HDD 115.

In another example embodiment, the types of audit log may be switched depending on whether the job is a censorship target as information to change the types of audit log. Hereinbelow, the method thereof will be described.

In the present example embodiment, a hardware configuration and a software configuration of the image forming apparatus 1000, a network configuration, and the like that are not described below are the same as those in the first example embodiment.

With reference to FIG. 6, a flowchart illustrating storage processing of log data of the image forming apparatus 1000 will be described. A program for implementing operations of the flowchart is stored in the flash memory 114 and executed by the CPU 111.

In step S601, the CPU 111 detects that an event that can be a storage trigger of an audit log has occurred. Specific examples of the event include a user's operation of the operation unit 130, authentication processing, image control processing such as an image transfer and an image conversion, an execution of a scan job or a print job, and a state change such as a shift of power state.

Next, in step S602, the CPU 111 determines whether the event occurred in step S601 is an event related to processing of image data. If the event is not an event related to the processing of image data (NO in step S602), the processing proceeds to step S606. In step 606, the CPU 111 stores a job log, and in step S607, the CPU 111 stores an operation log and an authentication log. Then, the CPU 111 ends the processing. Examples of the event not related to the processing of image data include, for example, occurrence of power control event such as a sleep shift and a wake-up, a network packet transmission/reception, and some kind of error detection.

In step S602, if the CPU 111 determines that the event is an event related to the processing of image data (YES in step S602), the processing proceeds to step S603.

In step S603, the CPU 111 determines whether the input/output destination of the image data is not the image forming apparatus 1000 but an external information processing apparatus connected to the image forming apparatus 1000 via the internal network 100. For example, if the job can be completed within the image forming apparatus 1000, such as a job that stores the image scanned by the scanner unit 150 in the HDD 115 and a normal copy job (NO in step S603), the processing proceeds to step S606. In step 606, the CPU 111 stores a job log, and in step S607, the CPU 111 stores an operation log and an authentication log. Then, the CPU 111 ends the processing.

In step S603, if the CPU 111 determines that the input/output destination of the image data is an external information processing apparatus (YES in step S603), the processing proceeds to step S604.

In step S604, the CPU 111 determines whether the executed job is a target job of image data censorship processing by the image data determination unit 308. More specifically, the CPU 111 determines whether the image data includes an improper character string or image. In the flowchart, since image data to be a target of the censorship processing is regarded as important image data, an image log is stored as a trail regardless of the result of the censorship (pass or fail).

In step S604, if the CPU 111 determines that the job is a target job of the image data censorship processing (YES in step S604), the processing proceeds to step S605. In step S605, the CPU 111 stores an image log in the HDD 115.

In step S604, if the CPU 111 determines that the job is not a target job of the censorship processing (NO in step S604), the processing proceeds to step S606. In step S606, the CPU 111 stores a job log. The job log stored in step S606 is log data smaller in volume than the image log. In addition, in the flowchart in FIG. 6, the job log is stored, but the job log may be set not to be stored.

In step S607, the CPU 111 stores the operation log and authentication log that are targets for all the events, and ends the processing of the flowchart in FIG. 6. The operation log and the authentication log are not as large as the image log in volume, and are small volume log data.

As described above, according to the present example embodiment, by selecting the logs to be stored depending on the input/output destination of the image of the image forming apparatus 1000 and the type of job, or whether the image data censorship processing is performed, it is possible to store necessary log data appropriately while reducing the storage of log data large in volume. As described above, even in a case where the capacity of the storage included in the image forming apparatus 1000 has a limit, it is possible to store the trail effectively, and to use the trail to analyze the cause of a trouble and grasp the damage situation by using the proper information when the trouble related to the security occurs.

Various embodiments of the present disclosure can be realized by processing of supplying software (program) for implementing one or more functions of the above-described example embodiments to a system or an apparatus via a network or various storage media, and then, a computer (a CPU or micro processing unit (MPU)) of the system or the apparatus reading and executing the program. In this case, the program and the recording medium storing the program constitute the present disclosure.

The example embodiments are described above in detail, but the present invention is not limited to such specific example embodiments. The example embodiments can be modified and changed in various ways while remaining within the scope of the present disclosure.

The various examples and example embodiments are described above, but the purpose and the scope of the present invention is not limited to the specific descriptions in the present disclosure.

Various embodiments of the present disclosure can be realized by processing of supplying a program for implementing one or more functions of the above-described example embodiments to a system or an apparatus via a network or a storage medium and one or more processors in the system or the apparatus reading and executing the program. Further, various embodiments of the present disclosure can also be realized by a circuit (e.g., application specific integrated circuit (ASIC)) that can implement one or more functions.

OTHER EMBODIMENTS

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-120248, filed Jul. 21, 2021, which is hereby incorporated by reference herein in its entirety.

What is claimed is:

1. An image forming apparatus capable of communicating with one or more information processing apparatuses via a network, the image forming apparatus comprising:
   one or more controllers having one or more processors and one or more memories, the one or more controllers being configured to perform operations comprising:
   generating a plurality of types of logs including a log related to a job; and
   performing log storage of storing the plurality of types of logs,
   wherein the log storage (i) stores a first type log and a second type log larger than the first type log in volume when the job is a job related to a first condition of not using a local area network but using an external network which is a network directly accessible through the Internet, and (ii) stores the first type log and does not store the second type log when the job is a job related to a condition different from the first condition.

2. The image forming apparatus according to claim 1, wherein the first type log includes at least one of an operation log generated when the image forming apparatus is operated, an authentication log generated when a user authentication is performed on the image forming apparatus, and a job log generated when the image forming apparatus executes a job.

3. The image forming apparatus according to claim 1, wherein the second type log includes at least an image log being a log including image data.

4. The image forming apparatus according to claim 1, wherein a job generated based on the condition different from the first condition is a job generated based on a condition related to an internal network different from the external network.

5. The image forming apparatus according to claim 1, wherein the operations further comprise registering a port number used by the external network,
wherein the external network is a network that uses a port with the port number registered in the registerting.

6. The image forming apparatus according to claim 1, further comprising a printer unit configured to form an image on a sheet,
wherein, in the log storage, an engine log being a predetermined operation parameter of the image forming apparatus is stored when the job is a print job that performs printing by the printer unit.

7. The image forming apparatus according to claim 1, further comprising:
a storage configured to store image data that is based on the job,
wherein the operations further comprise:
receiving an operation from a user; and
executing the job related to the image data stored in the storage, based on the operation received by the receiving,
wherein the first type log and the second type log are stored when the job related to the image data is a job using the external network, and the first type log is stored and the second type log is not stored when the job related to the image data is a job using a network different from the external network.

8. The image forming apparatus according to claim 1, further comprising:
a scanner unit configured to scan a sheet to obtain image data, wherein the operations further comprise transmitting the image data obtained by the scanner unit to the information processing apparatus via the external network or a network different from the external network,
wherein the first type log and the second type log are stored when the transmitting uses the external network, and the first type log is stored and the second type log is not stored when the transmitting uses the network different from the external network.

9. The image forming apparatus according to claim 1, said image forming apparatus being in an environment in which an appropriate application of security suitable for a usage environment is required.

10. The image forming apparatus according to claim 1, wherein the job related to the first condition of using an external network is a job of transferring an image from an outside and a job of transferring an image to an outside.

11. The image forming apparatus according to claim 1, wherein the job related to the first condition of using an external network is printing of an image transferred from an outside.

12. An image forming apparatus capable of communicating with one or more information processing apparatuses via a network, the image forming apparatus comprising:
one or more controllers having one or more processors and one or more memories, the one or more controllers being configured to perform operations comprising:
generating a plurality of types of logs including a log related to a job;
storing the plurality of types of logs; and
performing censorship processing on image data included in a job,
wherein the log storing stores a first type log and a second type log larger than the first type log in volume when the job is a job to be a target of the censorship processing, and stores the first type log and does not store the second type log when the job is a job different from the job to be the target of the censorship processing.

13. The image forming apparatus according to claim 12, wherein the first type log includes at least one of an operation log generated when the image forming apparatus is operated, an authentication log generated when a user authentication is performed on the image forming apparatus, and a job log generated when the image forming apparatus executes a job.

14. The image forming apparatus according to claim 12, wherein the second type log includes at least an image log being a log including image data.

15. The image forming apparatus according to claim 12, further comprising a printer unit configured to form an image on a sheet,
wherein the log storing stores an engine log being a predetermined operation parameter of the image forming apparatus when the job is a print job that performs printing by the printer unit.

16. The image forming apparatus according to claim 12, further comprising:
a storage configured to store image data that is based on the job
wherein the operations further comprise:
receiving an operation from a user; and
executing the job related to the image data stored in the storage, based on the operation received by the receiving,
wherein the first type log and the second type log are stored when the job related to the image data is a target job of the censorship processing, and the first type log is stored and the second type log is not stored when the job related to the image data is a job different from the target job of the censorship processing.

17. The image forming apparatus according to claim 12 further comprising:
a scanner unit configured to scan a sheet to obtain image data,
wherein the operations further comprise transmitting the image data obtained by the scanner unit to the information processing apparatus via the network,
wherein the first type log and the second type log are stored when the image data obtained by the scanner unit is related to a job to be the target of the censorship processing, and the first type log is stored and the second type log is not stored when the image data obtained by the scanner unit is related to a job different from the job to be the target of the censorship processing.

18. A control method for an image forming apparatus capable of communicating with one or more information processing apparatuses via a network and configured to store a plurality of types of logs, the control method comprising:
generating a plurality of types of logs including a log related to a job;
storing, by a storage controller of the image forming apparatus, a first type log and a second type log larger than the first type log in volume when the job is a job related to a first condition of not using a local area network but using an external network which is a network directly accessible through the Internet; and
storing, by the storage controller of the image forming apparatus, the first type log and not storing the second type log when the job is a job related to a condition different from the first condition.

19. The control method according to claim 18, wherein the first type log includes at least one of an operation log generated when the image forming apparatus is operated, an authentication log generated when a user authentication is performed on the image forming apparatus, and a job log generated when the image forming apparatus executes a job.

20. The control method according to claim 18, wherein the second type log includes at least an image log being a log including image data.

21. A non-transitory computer-readable storage medium storing a program for causing a computer to perform a control method for an image forming apparatus capable of communicating with one or more information processing apparatuses via a network and configured to store a plurality of types of logs, the control method comprising:
receiving a job;
storing a first type log and a second type log larger than the first type log in volume when the job is a job generated based on a first condition of not using a local area network but using an external network which is a network directly accessible through the Internet; and
storing the first type log and not storing the second type log when the job is a job generated based on a condition different from the first condition.

* * * * *